Jan. 24, 1961
W. E. BUCK ET AL
2,968,990
CONTINUOUS WRITING FRAMING CAMERA
Filed Sept. 23, 1958
2 Sheets-Sheet 1
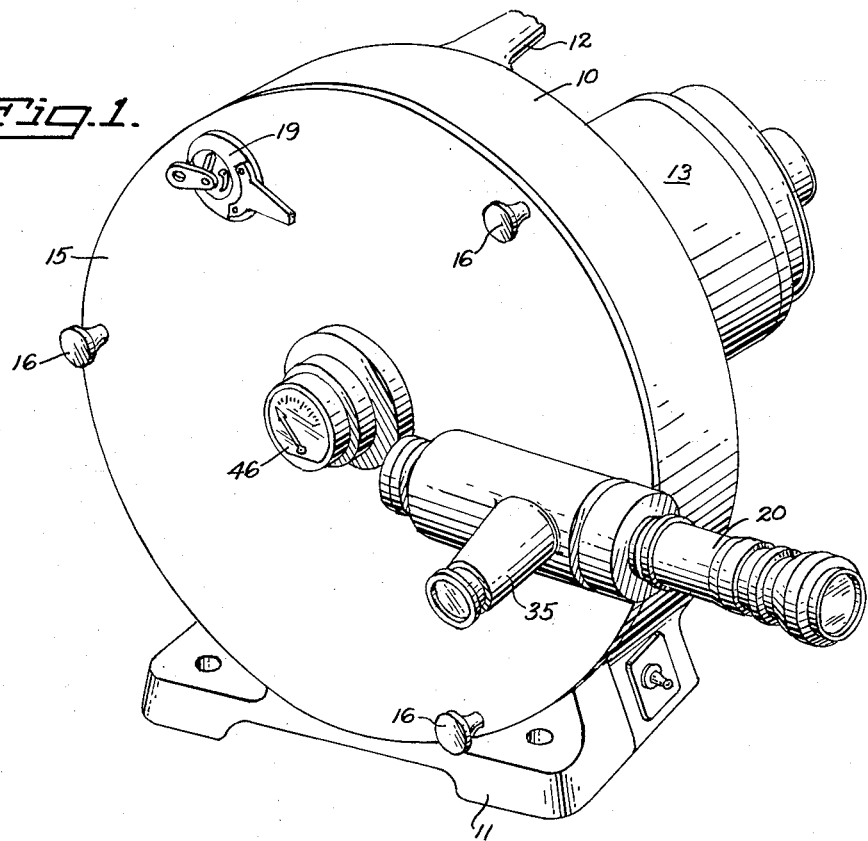
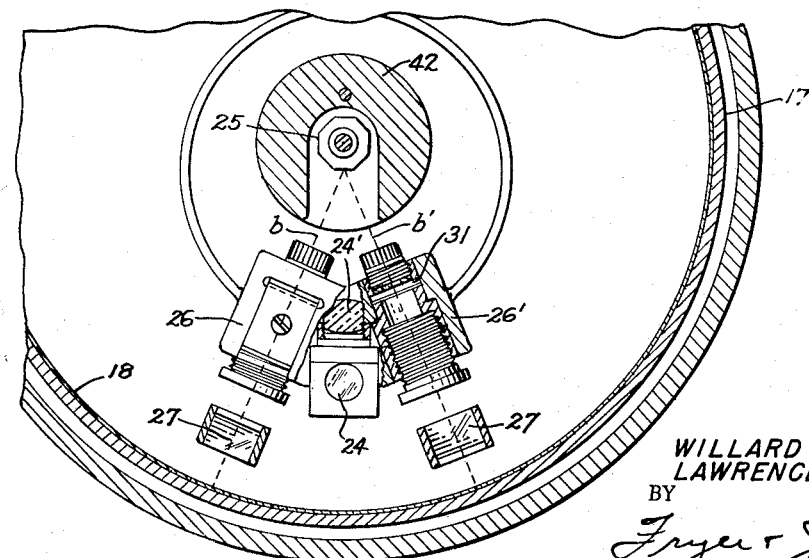
INVENTORS
WILLARD E. BUCK
LAWRENCE R. TEEPLE, JR
BY
*Fryer + Johnson*
ATTORNEYS

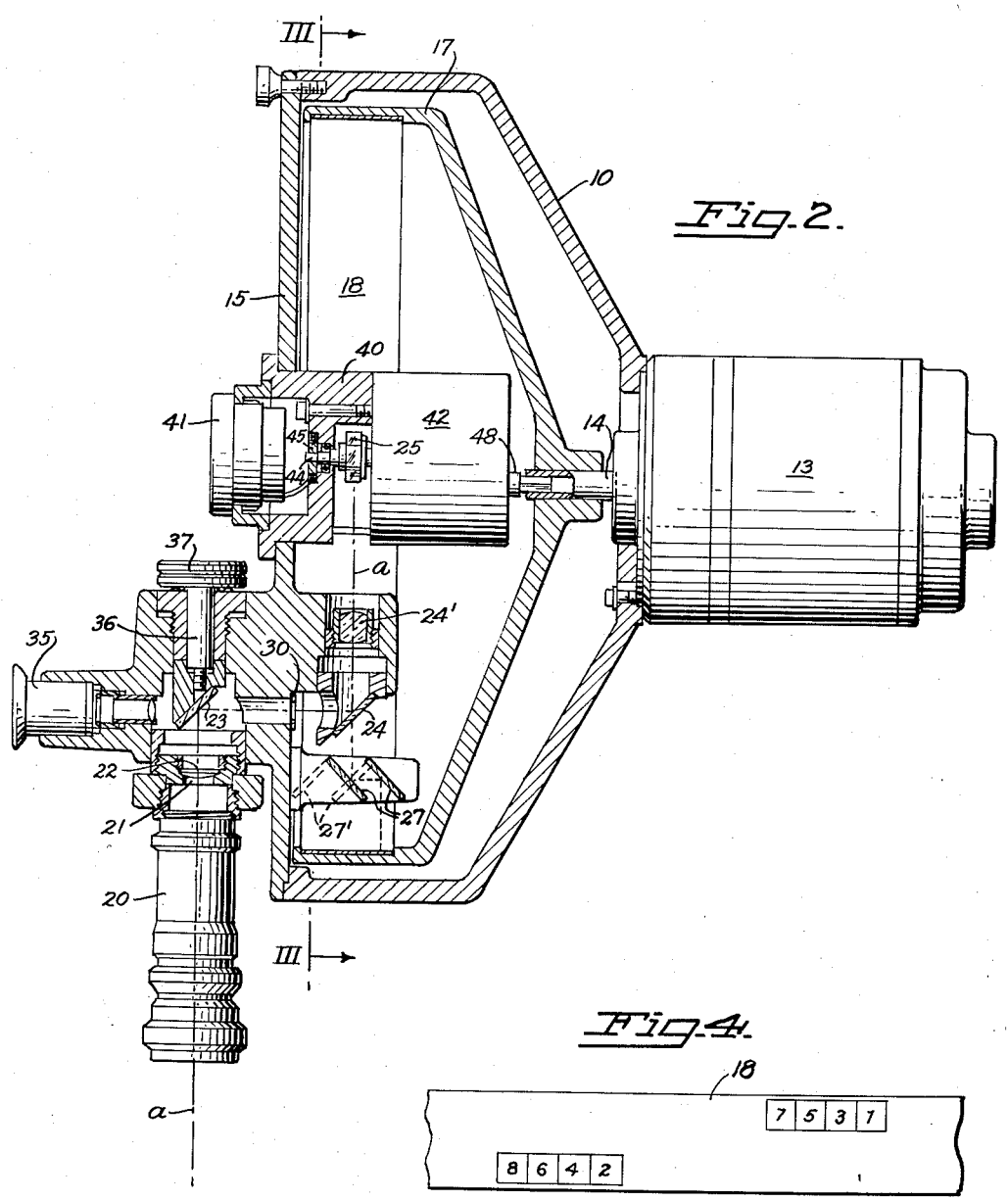

2,968,990
CONTINUOUS WRITING FRAMING CAMERA

Willard E. Buck, Boulder, Colo., and Lawrence R. Teeple, Jr., San Carlos, Calif., assignors to Beckman & Whitley, Inc., San Carlos, Calif., a corporation of California Filed Sept. 23, 1958, Ser. No. 762,735

3 Claims. (Cl. 88—16)

This invention relates to continuous writing framing cameras of the type capable of moderately high speed, for example a speed of about 25,000 more or less frames or exposures per second.

Among high speed framing cameras now known, there are two well known basic principles of operation. One is that in which a high speed rotating mirror reflects an image of an object in a sweeping path to be recorded upon an arcuately supported stationary film through multiple sets of optical elements. The other embodies a rotary cylindrical film transport and means for directing the image to the film carried therein as it rotates at high speed. Both of these principles of operation are known in cameras capable of extremely high speed ranging into millions of exposures per second. They are, however, very costly to manufacture and of large size and weight because of their numerous and complex elements and because of the necessity of heavy materials and parts required for the extremely high speeds of their rotating members which usually are of necessity turbine driven.

There is an increasing demand for a camera capable of moderately high speed operation, and it is an object of the present invention to provide such a camera which combines both of the principles referred to above in a novel manner to produce an inexpensive, portable and compact unit capable of the highest shutter speed and frame rate consistent with simplicity of design and construction.

It is also an object of the present invention to provide a camera of relatively low cost through elimination and reduction in number of expensive components of cameras of the high speed type.

A still further object of the present invention is to provide a camera of simple construction embodying a housing and a cover therefor with a rotatable film transport drum in the housing and with all optical elements carried by said cover whereby upon removal of the cover the optical elements retain their relative positions for use in projecting images from the exposed film onto a screen for viewing purposes.

Still further objects and advantages of the invention are made apparent in the following specification wherein a camera constructed in accordance with the invention is described in detail by reference to the accompanying drawings.

In the drawings:

Fig. 1 is a perspective view of a camera embodying the present invention,

Fig. 2 is a central horizontal sectional view of the camera shown in Fig. 1,

Fig. 3 is a fragmentary sectional view taken on the line III—III of Fig. 2, and

Fig. 4 is a view in elevation of a strip of film used in the camera illustrating schematically the sequence of arrangement and positioning of exposures produced on the film.

The camera shown in the drawings comprises a main housing 10 of generally cylindrical form supported on a base 11 and preferably provided with a carrying handle 12. A variable speed electric motor 13 is mounted on a rear face of the housing 10 with its driving shaft 14 extending into the housing as shown in Fig. 2. The front of the cylindrical housing is normally closed by a light tight cover 15 secured in place thereon by knurled head cap screws 16 and shown as 3 in number. A cylindrical film transport 17 is mounted within the housing 10 on the shaft 14 of the motor 13 for rotation thereby and a strip of film 18 is supported on the inner drum surface of the cylindrical transport 17. This film may be inserted and removed by means of a film loader structure generally indicated at 19, the construction of which is shown and described in detail in the pending application for United States Letters Patent of Willard E. Buck for "Film Loader for Rotating Drum Camera," filed June 6, 1958, Serial No. 740,309.

The optical path of the camera will be briefly described first by reference to Fig. 2. A housing 20 is shown for an objective lens which directs an image of an event to be recorded along the path indicated by the broken line $a$, first through a rectangular framing stop 21 and a field lens 22 to a mirror 23 by means of which it is reflected to a mirror 24 inside the housing and thence at right angles through an internal objective lens 24' and to a high speed rotating octagonal mirror 25. Each of the eight surfaces of the mirror 25 acts in successive order to sweep the light bundle one after the other through the two paths indicated at $b$ and $b'$ in Fig. 3 which paths are angularly related and in each of which is disposed the mounting 26 and 26' for two sets of relay lenses. These relay lenses in turn direct the image toward the film 18 through separate sets of mirrors 27 and 27' also shown in Fig. 2 as arranged in angularly related pairs, one pair of which directs its image to a position adjacent one edge of the film 18 while the other pair of mirrors directs its image toward the opposite edge of the film 18. Thus for any one surface of the rotating mirror 25, two images are produced upon the film 18 in positions corresponding to those indicated at 1 and 2 in Fig. 4 and the speed of the film transport drum is so correlated to the speed of the rotating mirror 25 that the next succeeding face of the mirror as it rotates projects the images to the film at positions 3 and 4 as illustrated in Fig. 4 and so on to the positions 5—6, 7—8, etc. The image and the film are moved at the same speed at the surface of the film where exposure takes place to attain good resolution by the expedient of displacing the object of this image which is an aerial image a slight distance off the face of the rotating mirror 25. By displacing the object focus either before or after the surface of the rotating mirror, the image will appear to rotate in one direction or the other depending upon whether it has been produced before or after the mirror face. Images disposed before the mirror appear from the position of the relay lens to be moving in a direction opposite the rotation of the mirror while images formed after the mirror appear to be moving in the same direction as the rotating mirror. Hence the direction of drum rotation may be either the same as or opposite to the rotation of the mirror depending upon the system which is selected.

Shuttering is accomplished by the use of diamond stops, or masks having diamond shaped openings, as is conventional practice in cameras of this general type, one being disposed in the optical path $a$ as indicated at 30 in Fig. 2 and one being disposed in each of the optical paths $b$ and $b'$ as indicated at 31 in Fig. 3. Masking or confining the bundle of light entering through the object lens along the optical path $a$ is accomplished by the rectangular mask 21, and the field lens 24', reduces the size of the masked image or bundle of light to approximately ½ where it may be received on a single surface of the rotating mirror 25. Corresponding increase of bundle size is accomplished by the relay lenses for exposing an image of the desired size at the surface of the film. The purpose of thus reducing the bundle size in the camera is to make possible the use of a small rotating mirror and reduce the power necessary to drive it as well as to reduce the cost of making and guiding the mirror surfaces.

Focusing of the camera on the object or event to be recorded is accomplished through an eye piece lens structure indicated at 35 and the mirror 23 which is reversibly mounted on the stem 36 of a manually actuated rotated knob 37 all in accorandce with conventional practice. The mirror 25 is mounted for rotation in a support 40 carried by the cover 15 and the support 40 also carries a volt meter 41 and a gear housing 42, the latter of which contains step up gears or gears which increase the driving ratio between the shaft 14 of the motor and the mirror 25. As is apparent in Fig. 2 the center of rotation of the mirror is spaced from the center of rotation of the transport drum 17 sufficiently to cause the reflecting surfaces of the mirror substantially to coincide with the center of the drum. An extension 44 of the shaft which supports the mirror 25 carries and rotates a magnet 45 which induces an electric current in the meter 41 in a conventional manner to cause an indicator hand shown at 46 in Fig. 1 to sweep across the face of the meter to a position which depends upon the speed of rotation of the mirror and corresponds to the slower speed of rotation of the drum. A scale on the face of the meter preferably reads in pictures per second to enable adjustment of the motor speed to the desired frequency of exposures to be made upon the film.

The input shaft of the gear train contained in the housing 42 is illustrated at 48 as having a hexagonal or splined connection with a hollow end of the motor shaft 14 so that upon removal of the cover 15 from the camera housing the rotating mirror 25 with its support will remain with the cover as will all of the optical elements of the camera which, as is shown in Figs. 2 and 3, are all mounted upon or indirectly supported by the cover to be carried thereby in their normally related positions. This enables the cover to be used as an element of a projector for showing the exposed frames on the film against a screen for observation and study by the simple expedient of removing the object lens housing 20 and replacing it with a suitable enlarging lens. With this optical train, which includes the rotatable mirror 25, it becomes a simple matter to project the juxtaposed frames on the film 18 as illustrated in Fig. 4 in numerical order or the order in which they were exposed to facilitate the study of a continuing event previously photographed. It is also possible with this method of projection to direct the projected images into a moving picture camera where they will expose the film in proper sequence to produce a moving picture film of the recorded event which may in turn be projected at any desired speed for study purposes.

Because of the use of only two sets of relay lenses and the means for exposing the film alternately adjacent opposite edges through the relay paths, an unusually high speed of shuttering and framing rate is accomplished w.th a relatively small simple and inexpensive construction.

We claim:

1. A camera of the kind described comprising a substantially drum shaped housing, a removable cover forming a closure for one side of the housing, a drum shaped film transport concentric to and rotatable in the housing, a motor with a drive shaft extending into and supporting the transport, and optical elements supported entirely by the cover for directing light from an object outside the housing to a film on the inner drum surface of the transport, said elements including a rotatable mirror, and a sliding dr.ve connection between the mirror and said drive shaft to facilitate removal of the cover with the mirror supported thereon.

2. A camera of the kind described comprising a substantially drum shaped housing, a removable cover forming a closure for one side of the housing, a drum shaped film transport concentric to and rotatable in the housing, a motor with a drive shaft extending into and supporting the transport, and optical elements supported entirely by the cover for directing light from an object outside the housing to a film on the inner drum surface of the transport, said elements including a rotatable mirror and a geared drive thereto all supported by the cover, and said geared drive having an input shaft concentric with said motor drive shaft and slidably connected thereto to facilitate removal of the cover.

3. A camera of the kind described comprising a housing, a film transport drum rotatable in the housing and adapted to carry a strip of film on its inner drum surface, a multi-face mirror rotatably mounted adjacent the center of the transport, optical elements for producing an image of an outside object at a position adjacent the face of the mirror, two relay optical systems for projecting said image at angularly spaced positions on said film as the mirror rotates, and mirrors interposed between the relay systems and the film to cause the relay systems to project their images toward opposite edges of the film strip, said rotatable mirror, optical elements, relay systems and last named mirrors all being mounted on a cover removably secured to said housing.

References Cited in the file of this patent

UNITED STATES PATENTS

| 2,400,885 | Miller | May 28, 1946 |
| 2,494,082 | Baird | Jan. 10, 1950 |
| 2,668,473 | Brixner | Feb. 9, 1954 |
| 2,687,062 | Baird | Aug. 24, 1954 |
| 2,853,918 | Yoler | Sept. 30, 1958 |